United States Patent
Hulkkonen et al.

(10) Patent No.: US 8,320,947 B2
(45) Date of Patent: Nov. 27, 2012

(54) RADIO CHANNEL ALLOCATION AND LINK ADAPTATION IN CELLULAR TELECOMMUNICATION SYSTEM

(75) Inventors: Jari Hulkkonen, Oulu (FI); Olli Piirainen, Oulu (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 1276 days.

(21) Appl. No.: 11/642,551

(22) Filed: Dec. 21, 2006

(65) Prior Publication Data

US 2007/0173271 A1 Jul. 26, 2007

(30) Foreign Application Priority Data

Dec. 21, 2005 (FI) .................................... 20055687

(51) Int. Cl.
*H04B 7/00* (2006.01)
(52) U.S. Cl. ......... 455/509; 455/42; 455/63.1; 455/450; 370/329; 370/337
(58) Field of Classification Search ....... 455/447–452.2, 455/454, 509–514, 42, 63.1; 370/329, 332, 370/333
See application file for complete search history.

(56) References Cited

U.S. PATENT DOCUMENTS

| | | | | |
|---|---|---|---|---|
| 3,681,694 A * | 8/1972 | Sarati | ................................ | 455/8 |
| 5,666,653 A * | 9/1997 | Ahl | ................................ | 370/330 |
| 5,870,676 A * | 2/1999 | Durvasula et al. | ............ | 455/450 |
| 6,061,568 A * | 5/2000 | Dent | ............................. | 455/450 |
| 6,085,094 A * | 7/2000 | Vasudevan et al. | ............ | 455/447 |
| 6,393,063 B1 * | 5/2002 | Flood et al. | ..................... | 375/257 |
| 6,584,318 B2 * | 6/2003 | Hakalin et al. | ................ | 455/453 |
| 6,799,044 B1 | 9/2004 | Wesby et al. | | |
| 7,379,741 B2 * | 5/2008 | Ahn et al. | ...................... | 455/450 |
| 7,672,642 B2 * | 3/2010 | Piirainen | ......................... | 455/42 |
| 7,756,519 B2 * | 7/2010 | Barak et al. | ..................... | 455/447 |
| 8,131,228 B2 * | 3/2012 | Liao et al. | ...................... | 455/101 |
| 8,160,629 B2 * | 4/2012 | Mate et al. | ..................... | 455/522 |
| 8,170,574 B2 * | 5/2012 | Kim et al. | ................. | 455/452.2 |
| 2003/0176192 A1 * | 9/2003 | Morimoto et al. | ............ | 455/453 |
| 2004/0018843 A1 * | 1/2004 | Cerwall et al. | ................ | 455/450 |
| 2004/0022207 A1 * | 2/2004 | Leung et al. | .................. | 370/321 |
| 2005/0190724 A1 * | 9/2005 | Hansen et al. | ................ | 370/329 |
| 2007/0063818 A1 * | 3/2007 | Witherspoon et al. | ........ | 340/10.1 |
| 2008/0108363 A1 * | 5/2008 | Yu et al. | ........................ | 455/450 |

FOREIGN PATENT DOCUMENTS

| | | |
|---|---|---|
| EP | 1 432 259 | 6/2007 |
| KR | 20010111279 A | 12/2001 |
| WO | WO 0057658 A1 | 9/2000 |

OTHER PUBLICATIONS

International Search Report PCT/FI2006/050559 filed Dec. 15, 2006.

* cited by examiner

*Primary Examiner* — Sharad Rampuria
(74) *Attorney, Agent, or Firm* — Squire Sanders (US) LLP

(57) ABSTRACT

A network element, a terminal and a method of allocating a radio channel to a connection between a terminal and a base station in a telecommunication system are provided. The number and properties of potential interferers in a plurality of available radio channels are determined, and channel allocation is performed on the basis of the determination.

22 Claims, 3 Drawing Sheets

RADIO CHANNEL ALLOCATION AND LINK ADAPTATION IN CELLULAR TELECOMMUNICATION SYSTEM

FIELD

The invention relates to radio channel allocation and link adaptation in a cellular telecommunication system.

BACKGROUND

One of the key problems in constructing and maintaining cellular radio networks is the limited scope of available radio spectrum. Careful planning of the use of radio frequencies aims at utilizing the available frequencies as efficiently as possible but simultaneously at minimizing co-channel interference and adjacent channel interference. By means of various models, available frequencies are divided into different cells so as to minimize the interference occurring in radio connections and thus maximize the network capacity. In a cell repeat pattern, the same or adjacent frequencies must not be too close to one another, because this causes excessive interference in the system. On the other hand, the tighter the repeat pattern, the more efficient the usage of the frequencies.

In known mobile systems, the allocation of a radio channel to a given subscriber terminal generally depends on whether or not a radio cell has an available traffic channel at that instant. In the simplest case, if said radio cell has a free radio channel, it is allocated to the subscriber terminal when necessary. More sophisticated channel allocation methods have also been developed. The quality of an idle radio channel may be taken into account. For example in a GSM system (Global System for Mobile Telecommunications), when allocating an uplink radio channel, the interference power level of idle radio channels is measured and a channel with the lowest interference level is allocated to a terminal. Since the GSM system is time-divisional, a traffic channel which comprises a time slot on a given frequency channel is allocated to the subscriber terminal.

U.S. Pat. No. 6,799,044 discloses a dynamic channel allocation method where a carrier-to-interference ratio of available channels is evaluated. In the solution, a channel and a frequency are dynamically selected on the basis of the evaluated ratio. However, the proposed solution does not take possible interference rejection into account and it cannot be used in systems employing fixed frequency planning.

BRIEF DESCRIPTION OF THE INVENTION

An object of the invention is to provide an improved solution for channel allocation and link adaptation. According to an aspect of the invention, there is provided a method of allocating a radio channel to a connection between a terminal and a base station in a telecommunication system, the method comprises determining the number and properties of potential interferers in a plurality of available radio channels, and performing channel allocation on the basis of the determination.

According to another aspect of the invention, there is provided a method of allocating a radio channel to a terminal in a cellular telecommunication system, comprising at least a base station and terminals, the method comprising: measuring, in the terminals signal strengths of base stations surrounding each terminal; calculating base station coverage areas which would be interfered with by uplink transmission of a terminal to which the radio channel is to be allocated, calculating the number of interferers interfering with the uplink transmission of the terminal to which the radio channel is to be allocated and the properties of the interfering signals, performing channel allocation on a terminal on the basis of the calculations.

According to an aspect of the invention, there is provided a method of performing link adaptation on a connection between a terminal and a base station in a telecommunication system, the method comprising: determining the number and properties of potential interferers in a plurality of available radio channels, and performing link adaptation on a connection on the basis of the determination.

According to an aspect of the invention, there is provided a network element of a telecommunication system, configured to allocate radio channels to connections between terminals and base stations of the telecommunication system. The network element is configured to determine the number and properties of potential interferers in a plurality of available radio channels, and perform channel allocation on a connection on the basis of the determination.

According to another aspect of the invention, there is provided a network element of a telecommunication system, configured to allocate radio channels to terminals of the telecommunication system and to receive from terminals of the telecommunication system measurement results relating to signal strength of a signal received by each terminal from base stations surrounding the terminal. The network element is configured to calculate base station coverage areas which would be interfered with by uplink transmission of a terminal to which the radio channel is to be allocated, calculate the number of interferers interfering with the uplink transmission of the terminal to which the radio channel is to be allocated, perform channel allocation on a terminal on the basis of the calculations.

According to an aspect of the invention, there is provided a base station controller of a telecommunication system, controlling a number of base stations connected to the base station controller, configured to allocate radio channels to terminals of the telecommunication system for communicating with at least one base station. The base station controller is configured to determine the number and properties of potential interferers in a plurality of radio channels, and perform channel allocation on a terminal on the basis of the determination.

According to another aspect of the invention, there is provided a telecommunication system, comprising a network element for allocating radio channels to connections between terminals and base stations of the telecommunication system. The system comprises a network element for determining the number and properties of potential interferers in a plurality of available radio channels, and performing channel allocation on a connection on the basis of the determination.

According to another aspect of the invention, there is provided a network element of a telecommunication system, configured to perform link adaptation on connections between terminals and base stations of the telecommunication system. The network element is configured to determine the number and properties of potential interferers in a plurality of available radio channels, and perform link adaptation on a connection on the basis of the determination.

According to yet another aspect of the invention, there is provided a terminal of a telecommunication system, configured to allocate radio channels to connections between the terminal and base stations of the telecommunication system. The terminal is configured to determine the number and properties of potential interferers in a plurality of available radio channels, and perform channel allocation on a connection on the basis of the determination.

According to yet another aspect of the invention, there is provided a computer program product encoding a computer program of instructions for executing a computer process for allocating a radio channel to a connection between a terminal and a base station in a telecommunication system, the process comprising: determining the number and properties of potential interferers in a plurality of available radio channels, and performing channel allocation on the basis of the determination.

According to yet another aspect of the invention, there is provided a computer program distribution medium readable by a computer and encoding a computer program of instructions for executing a computer process for allocating a radio channel to a connection between a terminal and a base station in a telecommunication system, the process comprising: determining the number and properties of potential interferers in a plurality of available radio channels, and performing channel allocation on the basis of the determination.

According to yet another aspect of the invention, there is provided a computer program distribution medium readable by a computer and encoding a computer program of instructions for executing a computer process for performing link adaptation to a connection between a terminal and a base station in a telecommunication system, the process comprising: determining the number and properties of potential interferers in a plurality of available radio channels, and performing link adaptation on the basis of the determination.

The invention provides several advantages. The solution according to the invention takes an interference situation into account in a more detailed manner compared to idle radio channel measurements. The solution does not need dynamic frequency allocation and is thus simpler to implement compared to the solution of U.S. Pat. No. 6,799,044, for example. Furthermore, the solution is especially suitable to be used in connection with interference cancellation methods. Interference cancellation methods are able to enhance reception quality when the number of interfering signals is low, or when one or few interfering signal levels are higher compared to the rest of the interfering signal levels. When there are only few interferers, preferably only one, the interference rejection procedures can cancel the interference even at a high power level of the interference.

In addition, the solution of the invention is suitable to be used in a system where more than one modulation method is used. For example, the invention may be used in systems where it is possible to allocate time slot specifically wide-band carriers which overlap with adjacent carriers and thus cause interference to other users and in the same time suffer from interference more than users with narrower bandwidth.

In an embodiment, the invention is applied to the uplink direction. In another embodiment, the invention is applied to the downlink direction.

In an embodiment of the invention, terminals of a telecommunication system measure signal strength of base stations signals they are receiving. These measurement results are transmitted to a network element, such as a base station controller, for example. The network element calculates the number and properties of potential interferers of idle radio channels. The number and properties of potential interferers of idle radio channels are compared with each other. Idle radio channels are prioritized on the basis of the comparison.

In an embodiment, when a terminal requires a radio channel, the network element allocates a radio channel which provides sufficient quality to the terminal.

LIST OF DRAWINGS

In the following, the invention will be described in greater detail with reference to the embodiments and the accompanying drawings, in which FIG. 1A shows an example of a cellular telecommunication system;

DESCRIPTION OF EMBODIMENTS

The present invention is applicable in various telecommunication systems, in which terminals are provided with different radio path properties. In the embodiments of the invention, the users are typically separated from each other in time domain and several frequency carriers are in use. Typical examples of a system in which the invention can be applied are cellular telecommunication systems such as GSM and GSM/EDGE based systems and evolutions of third generation systems such as 3.9G, also called LTE (Long Term Evolution) or EUTRAN (Enhanced UMTS Terrestrial Radio Access Network).

Figure 1A:
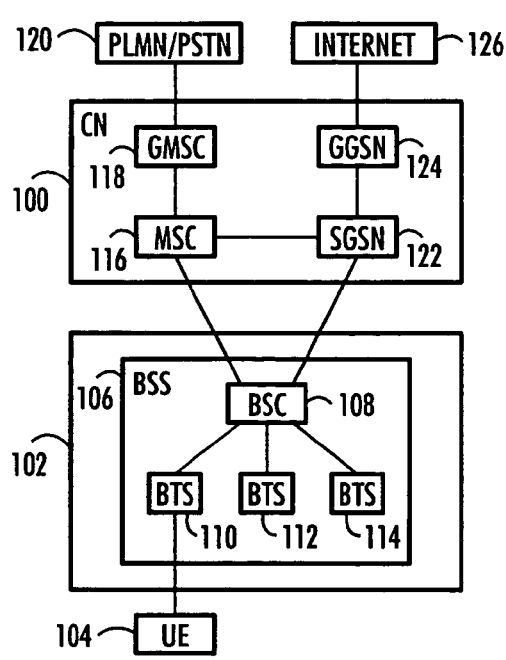
FIG. 1B illustrates an example of a structure of a base station controller.

Let us take a closer look at FIG. 1A, which illustrates an example of the structure of a cellular telecommunication system. FIG. 1A is a simplified block diagram describing the most important cellular telecommunication system parts at network element level and the interfaces between them. The structure and operation of the network elements are not described in detail, since they are commonly known.

The cellular telecommunication system may be divided into a core network (CN) 100, a GSM/EDGE radio access network (GERAN) 102 and a mobile station (MS) 104.

The GERAN 102 includes a base station system (BSS) 106, which includes a base station controller (BSC) 108 and base stations (BTS) 110, 112 and 114.

The structure of the core network 100 supports both circuit-switched connections and packet-switched connections.

A Mobile Services Switching Centre MSC 116 is the centre of the circuit-switched side of the core network 100. The functions of the mobile services switching centre 116 include: switching, paging, location registration of user equipment, handover management, collecting subscriber billing information, encryption parameter management, frequency allocation management and echo cancellation. The number of mobile services switching centres 116 may vary: a small network operator may be provided with a single mobile services switching centre 116, but larger core networks 100 may be provided with several.

Larger core networks 100 may comprise a separate Gateway Mobile Services Switching Centre GMSC 118 handling the circuit-switched connections between the core network 100 and external networks 120. The gateway mobile services switching centre 118 is located between the mobile services switching centres 116 and the external networks 120. The external network 120 may for instance be a Public Land Mobile Network PLMN or a Public Switched Telephone Network PSTN.

The network elements described in FIG. 1A are operational entities, and the physical implementation thereof may vary.

A Serving GPRS Support Node SGSN 122 is the centre of the packet-switched side of the core network 100. The main task of the serving GPRS support node 122 is to transmit and receive packets with the user equipment 104 supporting packet-switched transmission using the base station system 106. The serving GPRS support node 122 includes subscriber data and location information concerning the user equipment 104.

A Gateway GPRS Support Node GGSN 124 is the corresponding part on the packet-switched side to the gateway GMSC 118 on the circuit-switched side. The gateway GPRS support node 124 must be able to route the outgoing traffic from the core network 100 to external networks 126. In this example, the Internet represents the external networks 126.

The base station system 106 is composed of a Base Station Controller BSC 108 and Base Transceiver Stations or Base Stations BTS 110, 112 and 114. The base station controller 108 controls the base stations 110, 112 and 114. In principle, the aim is to place the equipment implementing the radio path and the functions associated therewith in the base station 110, 112 and 114 and to place the control equipment in the base station controller 108.

Figure 1B:
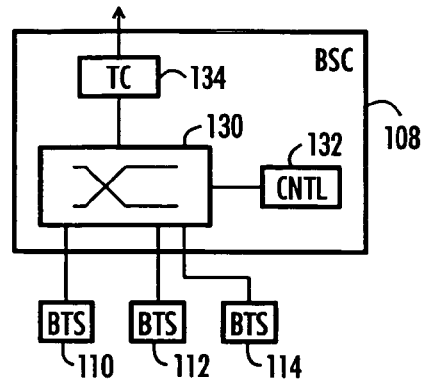

FIG. 1B illustrates an example of the structure of a base station controller 108 in more detail. The radio network controller 108 comprises a group switching field 130 and a control unit 132. The group switching field 130 is used for switching speech and data and for combining signalling circuits. The base station system 106 comprising the base station controller 108 and the base stations 110, 112 and 114 further comprises a transcoder 134. The transcoder 134 is usually located as close to a mobile services switching centre 116 as possible since speech can thus be transmitted in a cellular radio network mode between the transcoder 134 and the base station controller 108 using as little transmission capacity as possible. The transcoder may also be located in the mobile services switching centre 116 or in each base station.

The transcoder 134 converts the different digital speech encoding modes used between a public switched telephone network and a radio telephone network into compatible ones, e.g. from the fixed network mode into another mode of the cellular radio network, and vice versa. The control unit 132 is configured to perform radio resource management of the base stations 110, 112 and 114, inter-cell handover, frequency management, or allocation of frequencies to the base stations 110, 112 and 114, management of frequency hopping sequences, measurement of time delays in the uplink direction, operation and maintenance, and power control management, for example. The control unit 132 can be realized with one or more processors or discrete components, such as ASICs (Application Specific Intergrated Circuit) and associated software, for example.

The group switching field 130 is configured to perform switching procedures both to the public switched telephone network PSTN 120 through the mobile services switching centre 116 and to a packet transmission network 126.

Returning to FIG. 1A, the base station 110, 112 and 114 includes at least one transceiver implementing a carrier, or eight time slots, or eight physical channels. Typically, one base station serves one cell, but such a solution is also possible, in which one base station 110, 112 or 114 serves several sectorized cells. The base station 110, 112 and 114 has following functions: calculations of timing advance, measurements in the uplink direction, channel coding, encryption, decryption and frequency hopping, for example.

The subscriber terminal 104 includes at least one transceiver that implements the radio connection to the radio access network 102 or to the base station system 106. In addition, the subscriber terminal 104 typically comprises an antenna, a processor controlling the operation of the device and a battery. Many kinds of subscriber terminals 104 with various properties currently exist, for instance vehicle-mounted and portable terminals.

A terminal requires a radio channel when it communicates with a base station during a call, for example. A radio channel is allocated to the terminal in a network element of the telecommunication system responsible for channel allocation. In GSM and GSM/EDGE based cellular telecommunication systems the network element is base station controller (BSC).

In an embodiment of the invention, interference rejection combining (IRC) algorithm is utilized in the system in the uplink reception. IRC algorithms provide a well-known solution for reducing interference. The algorithms are especially efficient in situations where there is only one interfering signal. A receiver utilizing IRC may tolerate an interference signal of moderate level with only slight impact on the received signal quality. If the number of interferers is more than one the tolerated interference level is lower.

In an embodiment of the invention, terminals of the cellular telecommunication system measure downlink signal strength of base station signals they are receiving. These measurement results are transmitted to a network element, such as a base station controller, for example. In GSM and GSM/EDGE based cellular telecommunication systems, each base station transmits a broadcast control channel (BCCH) in a given time slot. Typically, this is the first time slot of a frame on one of the frequencies the base station is utilizing. The terminals of the system measure the signal strength of BCCH sent by surrounding base stations. In prior art, this information is utilized when making handover decisions, for example.

Figure 2:
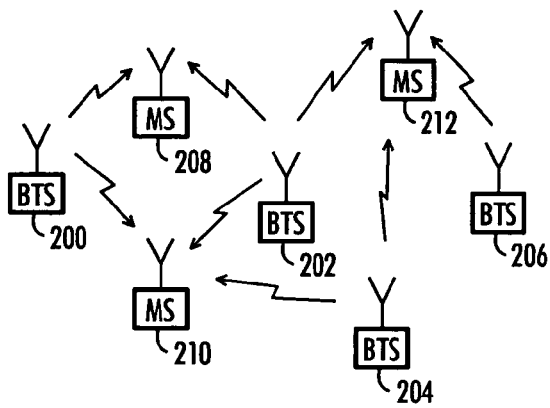
FIG. 2 illustrates an example of terminals carrying out downlink measurements of base station signals.

FIG. 2 illustrates measurement of BCCH. FIG. 2 shows four base stations 200, 202, 204 and 206 and three terminals 208, 210 and 212. Each terminal measures the BCCH signal strength of each BCCH it is able to receive and reports the measurement results to a network element responsible for channel allocation. Each terminal has been informed by the network of the frequency each nearby base station uses to transmit a BCCH. Let us assume in this example that the network element is a base station controller. In this example, the terminal 208 reports base stations 200 and 202. Terminal 210 reports base stations 200, 202 and 204. Terminal 212 reports base stations 202, 204 and 206. Thus, terminals 208 and 210 report base station 200. Because of the reciprocity of uplink and downlink channels, terminals 208 and 210 would be potential interferers to a terminal in the coverage area of base station 200. Whether or not terminals 208 and 210 are actual interferers depends upon the radio channel (time slot and frequency, for example) of the terminal in the coverage area of base station 200. For example, traffic in the same time slots in adjacent frequency carriers may cause interference. Furthermore, although a time slot is allocated to a terminal no traffic necessarily occurs all the time.

In an embodiment of the invention, when a radio channel is to be allocated to a terminal, the base station controller is configured to determine the available idle radio channels in the cell where the terminal is located. The base station controller is further configured to determine the number and properties of potential interferers in a plurality of the available radio channels, and perform channel allocation on a terminal on the basis of the determination. The properties of the potential interferers comprise the signal level of the interferer, modulation method used by the interferer or the signal bandwidth of the interferer, for example. By selecting a radio channel with only one interferer the properties of IRC may be effectively utilized.

Figure 3:
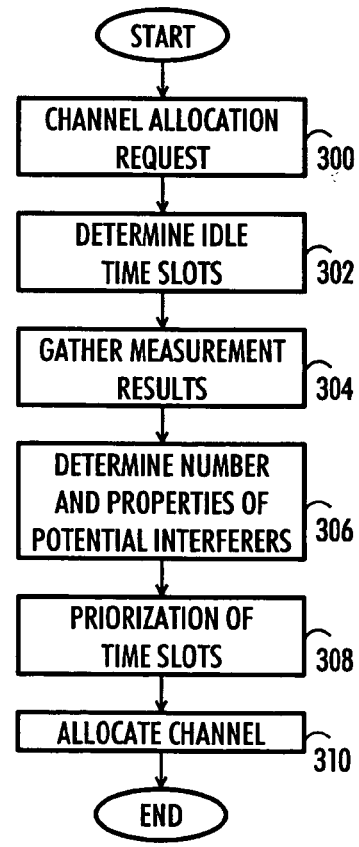
FIG. 3 illustrates an embodiment of the invention with a flow chart.

With reference to FIG. 3, an embodiment of the invention is illustrated with a flow chart.

In step 300, a channel allocation request is received by a network element responsible for channel allocation. Let us assume in this example that the network element is a base station controller. The cause for the channel allocation request may be a mobile originating or a mobile terminating call, for example.

In step 302, the base station controller determines available idle time slots in the cell where the terminal is located.

In step 304, the base station controller gathers the measurement results reported by the terminals.

In step 306, the base station controller calculates the number and properties of potential interferers regarding the available idle radio channels.

In step 308, the base station controller compares the number and properties of potential interferers of a plurality of radio channels with each other and prioritizes the channels. In an embodiment, the base station prioritizes available radio channels according to the number of potential interferers. In an embodiment, the base station prioritizes available radio channels according to the properties of potential interferers.

In step 310, the base station controller allocates a radio channel to the terminal on the basis of the determination and priorisation.

In an embodiment of the invention, the amount of interference the radio channel to be allocated would cause to surrounding cells is also taken into account in the channel allocation.

Figure 4:
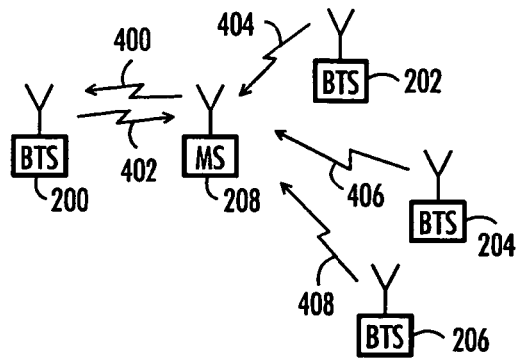
FIG. 4 illustrates another example of terminals carrying out downlink measurements.

In FIG. 4, a base station 200 serves a terminal 208. Thus, the terminal transmits an uplink signal 400 to the base station 200 and receives a downlink signal 402 from the base station. The system also comprises other base stations 202, 204, 206, near the area where the terminal is located. The terminal measures the BCCH signal strength of each BCCH it is able to receive. In the example of FIG. 4, the terminal 208 receives four BCCH signals 402, 404, 406 and 408. Of these signals, let us assume that signals 402, 404, 406 from base stations 200, 202 and 204, respectively, are the strongest ones. The terminal reports these signals to the base station controller. On the basis of this, it is possible for the base station controller to determine that the signal strength of the uplink signal transmitted by the terminal 208 is strongest in the cells served by base stations 200, 202 and 204.

In an embodiment of the invention, frame based transmission is utilized in the uplink direction of the cellular telecommunication system. The frames comprise time slots. In the above described GSM/EDGE based system, each frame comprises eight time slots. In an embodiment, different modulation methods may be used in different time slots. Different modulation methods may lead to different bandwidths.

Figure 5A:
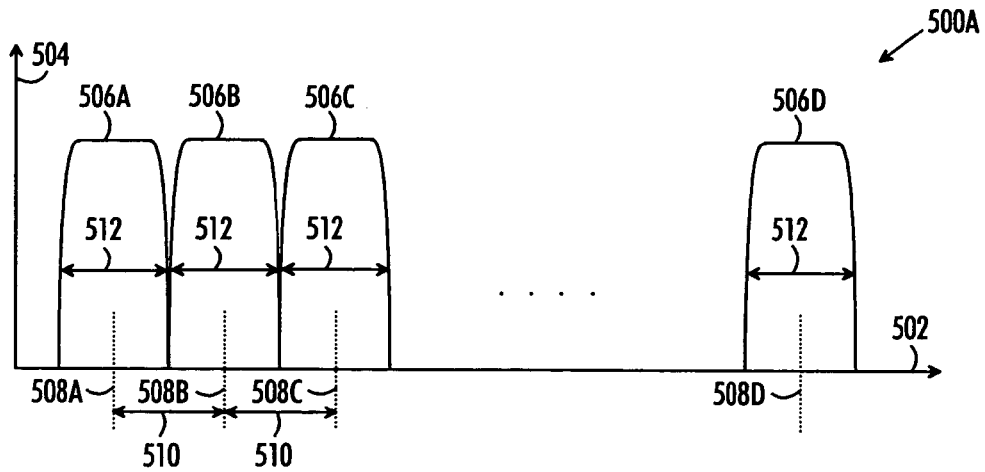
FIGS. 5A and 5B illustrate examples of a group of carrier waves in a GSM/EDGE based system.
Figure 5B:
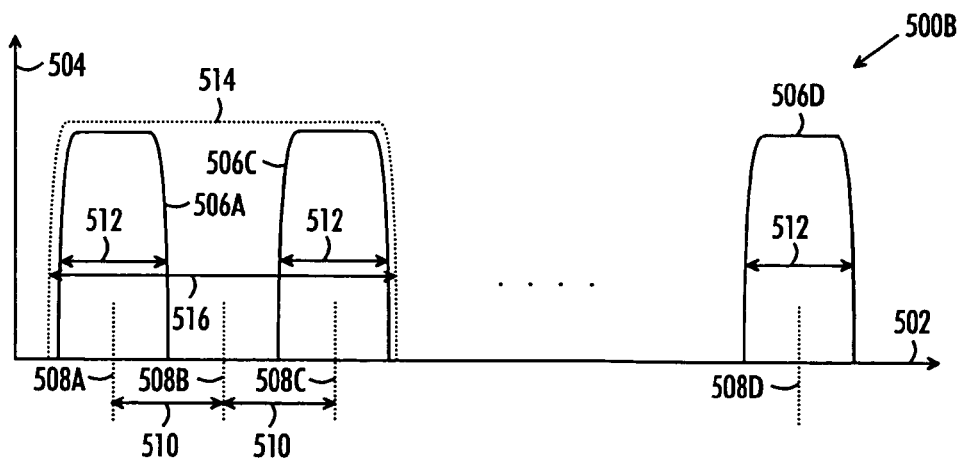

With reference to FIGS. 5A and 5B, let us consider the carrier wave structure of the GSM/EDGE system. The x-axis 502 and y-axis 504 show frequency and signal power, respectively, in arbitrary units.

FIG. 5A shows a group of carrier waves 500A comprising narrow-band carrier waves 506A, 506B, 506C, 506D. FIG. 5A shows the carrier wave structure according to the present GSM/EDGE system, whereas FIG. 5B illustrate the carrier wave structure of an enhanced GSM/EDGE system. In this context, the term "narrow band" refers to a narrow bandwidth 512 obtained with a first modulation symbol rate. A typical first modulation symbol rate of 13/48 MHz, also approximated with 270.833 kHz, results in the narrow bandwidth 512 of about 200 kHz.

The narrow-band carrier waves 506A-506D are separated by a predefined carrier spacing 510, which is typically defined as a separation of the band origins 508A, 508B, 508C, 508D of the narrow-band carrier waves 506A-506D. According to a GSM/EDGE specification, the predefined carrier spacing 510 is 200 kHz.

In FIG. 5B, a wide-band carrier 514 is generated into the group of the carrier waves 500B by applying linear modulation at a second modulation symbol rate that is a multiple of the first modulation symbol rate applied to the narrow-band carrier waves 506A-506D. In this case, the narrow-band carrier wave 506B is replaced with the wide-band carrier wave 514 while the structure of the rest of the group of the carrier waves 500A remains unaltered. The predefined carrier spacing 510 is preserved and the wide-band carrier wave 514 is allowed to overlap with adjacent carrier waves 506A, 506C.

In an embodiment of the invention, the second modulation symbol rate is twice the first modulation symbol rate. For example, when the first modulation symbol rate is 13/48 MHz, the second modulation symbol rate of 26/48 MHz, also approximated with 641.666 kHz, is obtained.

The linear modulation at the second modulation symbol rate results in a wide bandwidth 516 of the wide-band carrier wave 514. The second modulation symbol rate of 26/48 MHz results in the wide bandwidth 516 of about 600 kHz.

In the transmission of the wide-band carrier wave 514, the burst structure of the GSM/EDGE burst is preserved in the conventional structure, i.e. in the structure applied when transmitting signals at the first symbol rate.

As a consequence of the introduction of the wide-band carrier and preservation of the carrier spacing, the data transfer capacity of individual carriers and the overall data transfer capacity of the group of carriers increase.

Figure 6:
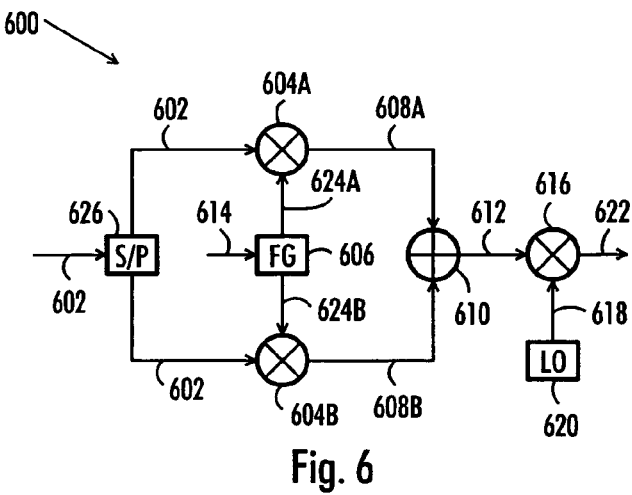
FIG. 6 illustrates an example of a structure of a wide-band carrier wave generator.

FIG. 6 illustrates a section of a transmitter utilizing wide-band carriers. The wide-band carrier wave generator 600 of a transmitter typically includes an I-modulator 604A and a Q-modulator 604B. The digital signal 602 is converted from a serial format into a parallel format in a serial-to-parallel converter (S/P) 626, and parallel components of the digital signal 602 are fed into the I-modulator 604A and the Q-modulator 604B.

The I-modulator 604A is provided with a first analog signal waveform 624A which encodes the bits of the digital signal 602 according to the applied linear modulation at the second modulation symbol rate.

The Q-modulator 604B is provided with a second analog signal waveform 624B which encodes the bits of the digital signal 602 according to the applied linear modulation at the second modulation symbol rate.

The first analog waveform 624A and the second analog waveform 624B may be generated in a frequency generator (FG) 606 which adjusts signal characteristics of the first analog waveform 624A and those of the second analog waveform 624B so that the applied modulation is realized. Such signal characteristics may be the relative phase and/or amplitude of the first analog waveform 624A and the second analog waveform 624B.

The frequency generator 606 may be provided with a control signal 614 including, for example, instructions on the applied modulation scheme and a clock signal. The timing information carried by the clock signal may be used to synchronize the feeding of the digital signal 602 into the wide-band carrier wave generator 600.

The I-modulator 604A outputs an I-branch waveform 608A into a combiner 610.

The Q-modulator 604B outputs a Q-branch waveform 608B into the combiner 610.

The combiner 610 combines the I-branch waveform 608A and the Q-branch waveform 608B and outputs a combined waveform 612.

The I-modulator 604A and the Q-modulator 604B may be implemented with a digital signal processor and software. In some applications, the I-modulator 604A and the Q-modulator 604B are implemented with ASICs (Application-Specific Integrated Circuit).

The combined waveform 612 is fed into an up-converter 616 which converts the combined waveform 612 into the wide-band carrier wave 622. The up-converter 616 is typically coupled to a local oscillator 620 which provides a local oscillator frequency 618 for the up-converter 616.

The wide-band carrier wave generator 600 may apply an M-ary phase shift keying (M-PSK), where M=2, 4, 8, 16, for encoding the bits of the digital signal 602 into the wide-band carrier wave 622 at the second symbol rate. In an embodiment of the invention, the wide-band carrier wave generator 600 applies an octal phase shift keying (8-PSK).

The wide-band carrier wave generator 600 may also apply an M-ary quadrature amplitude modulation (M-QAM), where M=2, 4, 8, 16, 32 or 64, for encoding the bits of the digital signal 602 into the wide-band carrier wave 622 at the second symbol rate.

When applying an M-ary modulation rate, the tail bits, training sequence bits, and the data bits are encoded at the M-ary modulation rate.

The wide-band carrier wave generator 600 is further capable of implementing narrow-band carrier waves 506A-506D.

The wide-band carrier radio channels described above may be allocated for terminals requiring high transmission capability. The drawback is that adjacent carriers overlap, thus creating interference. The overlapping carriers cause more interference to other users in the system. Also the users utilizing wide-band carriers suffer from the overlapping.

Figure 7:
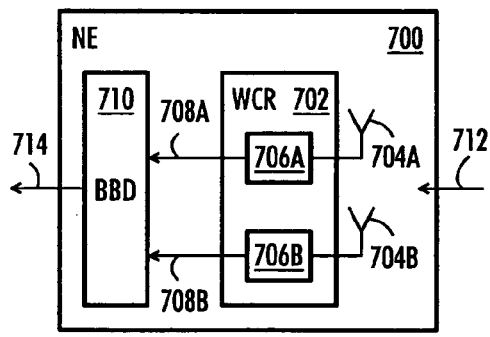
FIG. 7 illustrates an example of a structure of a base station.

FIG. 7 illustrates an example of the structure of a base station 700 of an enhanced GSM/EDGE system and capable of receiving and processing a wide-band carrier wave includes at least two diversity antennas 704A, 704B for sampling an electromagnetic field associated with the wide-band carrier wave 712 transmitted from the mobile station 102.

The diversity antennas 704A, 704B are coupled to a wide-band carrier receiver (WCR) 702 which receives and demodulates the wide-band carrier wave 712 at the second symbol rate. The WCR 702 may include receive antenna branches 706A, 706B, each coupled to an individual diversity antenna 704A, 704B. Each receive antenna branch 706A, 706B demodulates the wide-band carrier wave 712 separately, and outputs a receive antenna branch-specific digital signal 708A, 708B.

The receive antenna branch-specific digital signals 708A, 708B are inputted into a base band domain (BBD) 710 of the network element 700 for further processing. The BBD 710 outputs processed signals 714 to the higher layers of the GSM/EDGE telecommunications system.

In an embodiment of the invention, the base station 700 utilizes an interference rejection combining (IRC) algorithm in the uplink reception. The IRC algorithm may be directed at the receive antenna branch-specific digital signals 708A, 708B and implemented with a digital signal processor and software in the base band domain 710 of the base station 700.

In an IRC algorithm, multiple copies of versions of a signal containing the same data are received. The signals are combined so that the impact of interference is minimized.

IRC algorithms provide a well-known solution for reducing interference caused by overlapping carrier waves. It is assumed that a person skilled in the art is capable of implementing IRC algorithms in GSM/EDGE telecommunications systems without further description.

To enhance the operation of IRC, the number and properties of potential interferers of each radio channel may be taken into account in channel allocation, as described above. Efficient channel allocation in association with the usage of wide-band carriers may comprise following requirements. To make sure that interference caused by overlapping carriers does not increase too much in the system some interference control should be performed. To keep the interference level of the wide-band carriers users in acceptable level the channel allocation should control the usage of radio channel frequencies in such a manner that only a certain number of interfering signals hit inside allocated wide-band carrier. Thus, the radio channels should be allocated in such a manner that interference is optimised for a wide-band carriers. This maximises the spectral efficiency of the wide-band carriers.

IRC receivers may also be utilized in mobile terminals. Thus, the embodiment described above may be utilized in the downlink transmission direction as well.

Figure 8:
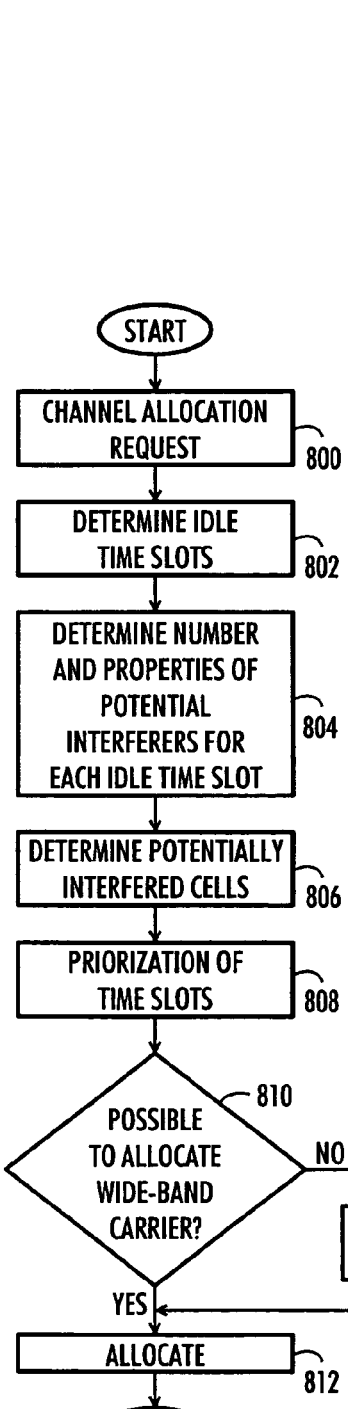
FIG. 8 illustrates an embodiment of the invention with a flow chart.

With reference to FIG. 8, an embodiment of the invention is illustrated with a flow chart.

In step 800, a channel allocation request is received by a network element responsible for channel allocation. Let us assume in this example that the network element is a base station controller. The cause for the channel allocation request may be a mobile originating or a mobile terminating call, for example. The requested channel to be allocated is a wide-band carrier.

In step 802, the base station controller determines available idle time slots in the cell where the terminal is located.

In step 804, the base station controller determines the number and properties of potential interferers regarding the available idle radio channels. This is based on the measurement results reported by the terminals of the system.

In step 806, the base station controller determines the cells the channel to be allocated would potentially interfere. This is also based on the measurement results reported by the terminals of the system.

In step 808, the base station controller prioritizes the available idle radio channels by comparing the number and properties of potential interferers of a plurality of radio channels with each other and taking also the number of interfered cells into account.

In step 810, the base station controller checks whether calculated interference date indicates that a wide-band carrier channel may be allocated on an idle channel.

If a channel with low enough number of interferers with suitable properties is found, the channel is allocated in step 812.

There may be situations that a suitable channel for a wide-band carrier was not found. In an embodiment, the time slot usage of the serving cell and/or surrounding interfered and interfering cells may be rearranged 814 with intercell handovers so that a good enough time slots for a wide-band carrier may become available. For example, a interference free time slot may be arranged for a wide-band carrier by directing terminals to perform inter-cell handovers for time slot to another. For example, a terminal using the same time slot on an adjacent carrier may be requested to perform a handover to a different time slot.

If it is not possible to get an interference free time slot, a low interference time slot may be arranged. A low interference time slot may be such that it is interfered by interferers of suitable number and properties in such a way that interference rejection combining can be efficiently utilized. For example, it is not desirable that two wide-band carrier users are in adjacent frequencies in the same time slots.

If a channel with low enough number of interferers with suitable properties can be arranged the channel is allocated in step 812.

If the base stations are utilizing frequency hopping the above described solution may be used with only minor modifications. As the terminals are hopping from frequency carrier to another according to a predetermined hopping sequence only time slots are taken into account in evaluating interference. The actual number of interferers cannot be counted, as the terminals are hopping using different hopping sequences and the situation is changing form frame to frame, but an average value may be obtained.

Embodiments of the invention may be utilized in systems where the time slot timing between base stations is knows. This is the case in synchronized systems. In non-synchronized systems time slot timing between base stations may be may be estimated using methods known in the art. For example, OTD (Observed Time Difference) of terminal may be utilized.

In non-synchronized systems, the time slots transmitted by the different base stations are not synchronized. Thus, a time slot for a base station may interfere two time slots used by an adjacent base station, for example. This may be taken into account when determining potential interferers and caused interference.

In an embodiment of the invention, the proposed solution is applied in link adaptation. Link adaptation is the selection of modulation and coding method for a connection. In some cases modulation and coding methods used on a connection may not offer best possible throughput or quality because of the varying conditions on the radio path. In an embodiment, the number and properties of potential interferers in a plurality of available radio channels are determined. This information is used to aid link adaptation procedures.

Figure 9:
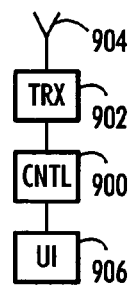
FIG. 9 illustrates an example of the structure of a terminal.

In an embodiment of the invention, the proposed solution is applied to a terminal of a cellular telecommunication system. The terminal may be configured to allocate radio channels to connections between the terminal and base stations of the telecommunication system. FIG. 9 illustrates an example of the structure of a terminal. The terminal comprises a controller 900, a transceiver 902 connected to the controller 900, an antenna 904 connected to the transceiver 902 and user interface 906 connected to the controller. The user interface may comprise a microphone, a speaker and a display, for example.

In an embodiment, the controller 900 is configured to determine the number and properties of potential interferers in a plurality of available radio channels, and perform channel allocation on a connection on the basis of the determination. The controller may transmit the channel allocation information to a base station in the system using the transceiver 902 and the antenna 904.

Embodiments of the invention may be realized in a network element comprising a control unit or a controller. The controller may be configured to perform at least some of the steps described in connection with the flowcharts of FIGS. 3 and 8. The embodiments may be implemented as a computer program comprising instructions for executing a computer process for allocating a radio channel to a connection between a terminal and a base station in a cellular telecommunication system by determining the number and properties of potential interferers in a plurality of available radio channels, and performing channel allocation on the basis of the determination.

The computer program may be stored on a computer program distribution medium readable by a computer or a processor. The computer program medium may be, for example but not limited to, an electric, magnetic, optical, infrared or semiconductor system; or device. The computer program medium may include at least one of the following: a computer readable medium, a program storage medium, a record medium, a computer readable memory, a random access memory, and an erasable programmable read-only memory.

Even though the invention has been described above with reference to an example according to the accompanying drawings, it is clear that the invention is not restricted thereto but it can be modified in several ways within the scope of the appended claims.

What is claimed is:

1. A method, comprising:
    determining, by a base station controller, a number and properties of potential interferers in a plurality of available radio channels, the properties of the potential interferers comprising modulation methods used by the potential interferers; and
    performing, by the base station controller, channel allocation for a terminal and selecting a modulation method for the allocated channel on the basis of the determination.

2. The method of claim 1, wherein
    the determination of the number and properties of potential interferers comprises calculating the number and properties of potential interferers in a plurality of radio channels, and comparing the number and properties of potential interferers of the plurality of radio channels with each other, and
    wherein performing channel allocation comprises performing channel allocation on the basis of the comparison.

3. The method of claim 1, wherein the properties of the potential interferers comprise at least one of a signal level of the interferer, and signal bandwidth of the interferer.

4. The method of claim 1, further comprising prioritizing available radio channels according to the number or the properties of potential interferers.

5. The method of claim 2, wherein the calculation of the number and properties of potential interferers in a plurality of radio channels comprises receiving downlink measurements carried out in a number of terminals of a telecommunication system.

6. The method of claim 1, further comprising determining for a number of available radio channels, on the basis of downlink measurements carried out by a number of terminals of a telecommunication system, cells of the telecommunication system which would be interfered with by uplink transmission of a terminal to which a radio channel is to be allocated.

7. The method of claim 1, further comprising:
    transmitting a group of carrier waves modulated at a first modulation symbol rate, the carrier waves being separated by a predetermined carrier spacing; and
    generating at least one wide-band carrier wave in the group of carrier waves by applying linear modulation at a second modulation symbol rate, the second modulation symbol rate being a multiple of the first modulation symbol rate, while preserving the predetermined carrier spacing and allowing the at least one wide-band carrier wave to overlap with at least one adjacent carrier wave.

8. The method of claim 7, further comprising:
utilizing frame based transmission, a frame comprising time slots; and
utilizing a wide-band carrier at least in one time slot of the frame.

9. The method of claim 8, further comprising:
allocating a time slot in which a wide-band carrier is used to a terminal.

10. A method, comprising:
receiving, at a base station controller, downlink signal strength measurements taken by terminals of base stations surrounding each terminal;
calculating, by the base station controller, base station coverage areas which would be interfered with by uplink transmission of a terminal to which a radio channel is to be allocated;
calculating, by the base station controller, a number of interferers interfering with the uplink transmission of a terminal to which the radio channel is to be allocated and properties of the interferers, the properties of the interferers comprising modulations methods used in the interferers; and
performing, by the base station controller, channel allocation for the terminal and selecting a modulation method for the allocated channel on a terminal on the basis of the calculations.

11. The method of claim 10, further comprising:
rearranging channel allocations of a base station serving the terminal to which the radio channel is to be allocated and of the surrounding base stations prior to performing the channel allocation so that the radio channel to be allocated is interfered with by only one interfering signal.

12. An apparatus of a base station controller, comprising:
a processor; and
a memory including computer program code, the memory and the computer program code configured to, with the processor, cause the apparatus at least to
determine a number and properties of potential interferers in a plurality of available radio channels, the properties of the potential interferers comprising modulation methods used by the potential interferers, and
perform channel allocation for a terminal and select a modulation method for the allocated channel on a connection on the basis of the determination.

13. The apparatus of claim 12, wherein the properties of potential interferers comprise at least one of a signal level of the interferer and signal bandwidth of the interferer.

14. The apparatus of claim 12, wherein the apparatus is configured to prioritize available radio channels primarily according to the number of potential interferers and secondarily according to the properties of the interferers, and perform channel allocation on the basis of the prioritization.

15. An apparatus of a base station controller, comprising:
a processor; and
a memory including computer program code, the memory and the computer program code configured to, with the processor, cause the apparatus at least to
calculate base station coverage areas which would be interfered with by uplink transmission of a terminal to which a radio channel is to be allocated,
calculate the number of interferers interfering with the uplink transmission of the terminal to which the radio channel is to be allocated and properties of the interferers, the properties of the interferers comprising modulations methods used by the interferers, and
perform channel allocation for the terminal and select a modulation method for the allocated channel on a terminal on the basis of the calculations.

16. The apparatus of claim 15, wherein available radio channels comprise:
a group of carrier waves modulated at a first modulation symbol rate, the carrier waves being separated by a predetermined carrier spacing; and
at least one wide-band carrier wave generated by applying linear modulation at a second modulation symbol rate, the second modulation symbol rate being a multiple of the first modulation symbol rate, while preserving the predetermined carrier spacing and allowing the at least one wide-band carrier wave to overlap with at least one adjacent carrier wave.

17. A controller configured to:
determine, in a base station controller, a number and properties of potential interferers in a plurality of radio channels, the properties of the potential interferers comprising modulation methods used by the potential interferers; and perform, by the base station controller, channel allocation for a terminal and select a modulation method on a terminal on the basis of the determination.

18. A system, comprising:
a base station controller configured to determine a number and properties of potential interferers in a plurality of available radio channels, the properties of the potential interferers comprising modulation methods used by the potential interferers, and perform channel allocation for a terminal and select a modulation method for the allocated channel on a connection on the basis of the determination.

19. A terminal, configured to:
determine a number and properties of potential interferers in a plurality of available radio channels, the properties of the potential interferers comprising modulation methods used by the potential interferers; and
perform channel allocation and select a modulation method for the allocated channel on a connection on the basis of the determination,
wherein the plurality of available radio channels comprises:
a group of carrier waves modulated at a first modulation symbol rate, the carrier waves being separated by a predetermined carrier spacing; and
at least one wide-band carrier wave generated by applying linear modulation at a second modulation symbol rate, the second modulation symbol rate being a multiple of the first modulation symbol rate, while preserving the predetermined carrier spacing and allowing the at least one wide-band carrier wave to overlap with at least one adjacent carrier wave.

20. A computer program product embodied on a computer distribution medium, the computer program product encoding a computer program of instructions for executing a computer process, the process comprising:
determining, by a base station controller, a number and properties of potential interferers in a plurality of available radio channels, the properties of the potential interferers comprising modulation methods used by the potential interferers; and
performing, by the base station controller, channel allocation for a terminal and selecting a modulation method for the allocated channel on the basis of the determination.

21. A computer program distribution medium readable by a computer and encoding a computer program of instructions for executing a computer process, the process comprising:
  determining, at a base station controller, a number and properties of potential interferers in a plurality of available radio channels, the properties of the potential interferers comprising modulation methods used by the potential interferers; and
  performing, by the base station controller, channel allocation for a terminal, and selecting a modulation method for the allocated channel on the basis of the determination.

22. The computer program distribution medium of claim 21, the distribution medium including at least one of a computer readable medium, a program storage medium, a record medium, and a computer readable memory.

* * * * *

UNITED STATES PATENT AND TRADEMARK OFFICE
CERTIFICATE OF CORRECTION

| | |
|---|---|
| PATENT NO. | : 8,320,947 B2 |
| APPLICATION NO. | : 11/642551 |
| DATED | : November 27, 2012 |
| INVENTOR(S) | : Hulkkonen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1400 days.

Signed and Sealed this
Second Day of September, 2014

Michelle K. Lee
*Deputy Director of the United States Patent and Trademark Office*